United States Patent
Key et al.

(10) Patent No.: US 10,831,875 B2
(45) Date of Patent: *Nov. 10, 2020

(54) SYSTEM AND APPARATUS FOR SECURE PASSWORD RECOVERY AND IDENTITY VERIFICATION

(71) Applicant: Capital One Services, LLC, McLean, VA (US)

(72) Inventors: Kate Key, Effingham, IL (US); Anh Truong, Champaign, IL (US); Jeremy Goodsitt, Champaign, IL (US); Kenneth Taylor, Marrero, LA (US); Reza Farivar, Champaign, IL (US); Mark Watson, Urbana, IL (US); Fardin Abdi Taghi Abad, Champaign, IL (US); Austin Walters, Savoy, IL (US); Vincent Pham, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 90 days.

This patent is subject to a terminal disclaimer.

(21) Appl. No.: 16/190,736

(22) Filed: Nov. 14, 2018

(65) Prior Publication Data

US 2020/0026841 A1    Jan. 23, 2020

Related U.S. Application Data

(63) Continuation of application No. 16/042,057, filed on Jul. 23, 2018, now Pat. No. 10,162,956.

(51) Int. Cl.
*G06F 21/36* (2013.01)
*H04L 29/06* (2006.01)
*G06Q 10/10* (2012.01)

(52) U.S. Cl.
CPC .......... *G06F 21/36* (2013.01); *G06Q 10/10* (2013.01); *G06Q 10/107* (2013.01);
(Continued)

(58) Field of Classification Search
None
See application file for complete search history.

(56) References Cited

U.S. PATENT DOCUMENTS 6,973,575 B2    12/2005    Arnold
7,230,731 B2    6/2007     Dan et al.
(Continued)

FOREIGN PATENT DOCUMENTS

| CN | 103235909 | 8/2013 |
|----|-----------|--------|
| EP | 2959660   | 9/2016 |
| JP | 4715181   | 4/2011 |

OTHER PUBLICATIONS

Liao S, "Facebook uses selfies as login authentication for suspicious activity," The Verge, 2017.

*Primary Examiner* — Fatoumata Traore
(74) *Attorney, Agent, or Firm* — Hunton Andrews Kurth LLP

(57) ABSTRACT

A secure method for resetting the password for an account is disclosed. During the setup of the account, the user can provide the service provider with a media file, and when the user asks the service provider to reset the password for the account, the user will be prompted with several media files. The user can be asked to identify the media file that the user provided to the service provider at the time of the setup of the account. If the user properly identifies the media file, the password will be reset.

19 Claims, 6 Drawing Sheets

(52) U.S. Cl.
CPC .... *H04L 63/083* (2013.01); *G06F 2221/2103* (2013.01); *G06F 2221/2117* (2013.01); *G06F 2221/2131* (2013.01)

(56) References Cited

U.S. PATENT DOCUMENTS

| | | | |
|---|---|---|---|
| 7,610,491 | B1 | 10/2009 | Tsao |
| 7,975,292 | B2 | 7/2011 | Corella |
| 8,881,251 | B1 * | 11/2014 | Hilger .................. H04L 63/083 713/183 |
| 9,886,572 | B2 | 2/2018 | Goldberg et al. |
| 2003/0182584 | A1 | 9/2003 | Banes et al. |
| 2005/0138399 | A1 | 6/2005 | Cheston et al. |
| 2006/0059362 | A1 | 3/2006 | Paden et al. |
| 2007/0266428 | A1 | 11/2007 | Downes et al. |
| 2007/0277224 | A1 | 11/2007 | Osborn et al. |
| 2008/0022393 | A1 | 1/2008 | Waltermann et al. |
| 2008/0040613 | A1 | 2/2008 | Challener |
| 2008/0046982 | A1 * | 2/2008 | Parkinson ............. H04L 9/0891 726/5 |
| 2008/0120423 | A1 * | 5/2008 | Hall ....................... H04L 12/12 709/229 |
| 2008/0209526 | A1 * | 8/2008 | Varghese ................. H04L 9/32 726/5 |
| 2010/0043062 | A1 | 2/2010 | Alexander et al. |
| 2010/0222024 | A1 | 9/2010 | Sigmund et al. |
| 2013/0159699 | A1 | 6/2013 | Torkkel |
| 2013/0340057 | A1 | 12/2013 | Kitlyar |

* cited by examiner

SYSTEM AND APPARATUS FOR SECURE PASSWORD RECOVERY AND IDENTITY VERIFICATION

CROSS REFERENCE TO RELATED APPLICATION:

The subject application is a Continuation of Ser. No. 16/042,057 filed Jul. 23, 2018, the contents of which is hereby incorporated by reference in its entirety.

BACKGROUND

With the advent of the Internet and advancements in computer systems, online accounts have become an important part of our daily lives. Online accounts facilitate interactions between service providers and users (or customers) from anywhere in the world at any time. Because of these features, online accounts offer an unsurpassed level of convenience for the users. However, as online accounts have become popular, computer systems are facing new challenges that did not exist in the pre-Internet era. For example, in the pre-Internet era, physical access to computer systems was necessary for any unauthorized access to the networks supported by the systems. Because maintaining the security of a hosting facility was relatively easy, these systems and networks enjoyed a high level of security and isolation against unauthorized access.

However, the Internet has made it possible to access these systems from almost anywhere in the world. As a result, physical access to computer systems are not necessary anymore to manipulate or exploit the content of these systems. Therefore, new groups of sophisticated criminals, many of whom live outside the jurisdiction of the law enforcement of this country, have become active. Oftentimes, these criminals orchestrate attacks on the computer networks of major companies and steal valuable information. In many cases, the attackers gain access to the networks by obtaining the usernames and passwords of unsuspecting users. Thus, maintaining the security of online accounts has become an utmost important task for administrators of computer networks.

SUMMARY

In many cases, an online account has a username and password to restrict access to the account. Generally, this protection scheme provides an effective barrier against unauthorized access to an online account. However, remembering the usernames and passwords for the accounts has become a daunting task. These days an ever-expanding number of service providers allow their customers to receive services through online accounts. In practice, this means that an average user of online services now has to remember an ever-increasing number of usernames and passwords. To make the matters worse, many of the service providers require the users to create accounts that follow certain rules and guidelines. For example, some service provides require the users to include numbers in the username or password. Also, requiring the users to include upper case characters as well symbols in passwords has become very common. These rules and guidelines require the users to create usernames and passwords that are not personal to and memorable for the user. While storing the usernames and passwords can prevent users from forgetting them, this can reduce the security of the username and password. In other words, writing the password on a piece of paper or storing it in a text file on an electronic device can reduce the security of the password, and it can make it more susceptible to being compromised. In some cases, the users are prohibited by law from writing their username or password. Given the increasing number of usernames and passwords that the users have to remember, and that the combinations used in the usernames and passwords are not easy to remember for users, it is very likely that users forget their usernames or passwords. As a result, resetting the username or password has become a very common problem for system administrators of computer networks.

Various techniques have been proposed for resetting the password (or username) for an online account. Some service providers allow users to reset their passwords by calling a customer service number. In these organizations, in order for the user to reset the user's password, the user will have to call the customer service center and reset the password over the phone. However, before resetting the password, the user has to establish the user's identity by disclosing several pieces of personal information. If the service representative ascertains that the user is the true owner of the account, the representative can reset the password for the account. This is generally done by either allowing the user to enter a temporary pin over the phone or emailing a temporary password to the user. However, there are a few drawbacks associated with this method of resetting passwords. First, establishing the user's identity can be a problem. For example, in smaller organizations that have only a few users, the administrator generally knows the users, and the administrator can ascertain the true identity of the caller over the phone, e.g., voice recognition. However, for larger organizations with many users, the call representative does not know the caller, and therefore, an imposter can call the call center and reset the password. Second, these call centers are resource intensive and the number of incoming calls is unpredictable. As a result, the service provider must always have a team of representatives available to address these calls, which can be expensive for the service provider.

Some service providers allow users to reset the passwords by mailing a temporary password to the users. In other words, in response to a request by a user for resetting the password, the service provider mails a letter to the user including the user's new temporary password. Subsequently, the user can enter the temporary password into the system and reset the password. However, this method of resetting a password has its drawbacks. Specifically, in this system, the resetting process is not instantaneous, and the user would have to wait for a letter to be mailed and delivered before the user can reset the password. Moreover, usually the user's password is sent to the user's mailing address on file. However, if the user is travelling or has changed address, the user will have to take additional steps to reset the password, which can make the process very inconvenient for the user.

Some service providers ask users predetermined questions over the Internet, and if the user responds to these questions correctly, the service provider resets the password. For example, while setting up an online account, the service provider asks the users several predetermined questions such as the user's mother's maiden name. In order for the user to set up the account, the user has to answer these questions and the service provider stores the answers. Later, if the user expresses a desire to reset the password of the user's account, the user will be prompted with some or all of the same questions. Upon providing the pre-stored answer, the account will be reset. This method of resetting account passwords is helpful because it instantaneously resets the user's password. Service providers also prefer this method because the resetting can be done automatically, i.e., process requires minimal human input on the part of the service provider. However, there are a few drawbacks to this method. First, this method is not very secure because the answers to many of the predetermined questions are available online. For example, an unauthorized hacker might be able to guess some of these answers by searching the web (or the dark web) and might attempt to reset the password for the user. Moreover, with creation of black markets for selling personal information of users, hackers might capitalize on this information to guess a user's answer to these questions. Second, the users might forget the answers to the questions or the users' answers to the questions might change over time. For example, a user's answer to a question about the user's favorite movie might change over time.

Some service providers allow the users to customize the reset questions so that the questions are not predetermined. For example, a user can draft a security reset question and provide the answer to the question to the service provider. This method is helpful because the more particularized the question is the less likely the answer would be available to a hacker. However, in this day and age, all of service providers are susceptible to online attacks and hacking attempts, and if the service provider is hacked, the answer to these questions can be compromised. Moreover, the more particularized the question and the answer to the question are, the more likely that the user would forget them. Therefore, if the user attempts to recover the user's password after several years, it is very likely that the user would not remember the answer to the proposed question.

Therefore, it is an object of the present disclosure to propose a method, apparatus and system for overcoming these shortcomings.

Many studies suggest that human beings tend to remember a visual cue better than a word or phrase because our visual memory is stronger than our verbal memory. For example, a person can easily remember a photo of her teacher, while the person might forget the name of the teacher after a few years. Similarly, some people tend to remember a video recording or a vocal recording better than a word or phrase. Therefore, according to an aspect of the present disclosure, during the setup of an account (which can be online or offline account), the user provides the service provider with a media file, and when the service provider is asked to reset the password for the account, the user will be asked a question and prompted with several media files to identify the media file that the user provided to the service provider. A media file can be a digital photo, video clip, music segment, a GIF, a voice recording, etc. The user is more likely to remember the media file and selecting the media file among other media files would be easier for the user. At the same time, it is unlikely for a hacker to have seen the media file or to have discovered the relationship between the user and the media file, particularly if the hacker does not know the user. Therefore, this method of resetting password for an account is more secure and less onerous for the user.

According to another aspect of the present disclosure, the system is provided with an artificial intelligence which enables the system to search and retrieve several media files related or similar to the media file uploaded by the user. When the user requests to reset the password, the system displays the uploaded media file as well as the related media files. Mixing the uploaded media file with several other media files would enhance the security of the system. However, the system is not required to display the uploaded media file in every instance. In some embodiments, the system could display only the related media files and ask the user if the user recognizes any of the media files.

DETAILED DESCRIPTION

The Sign-Up Process

Figure 1:
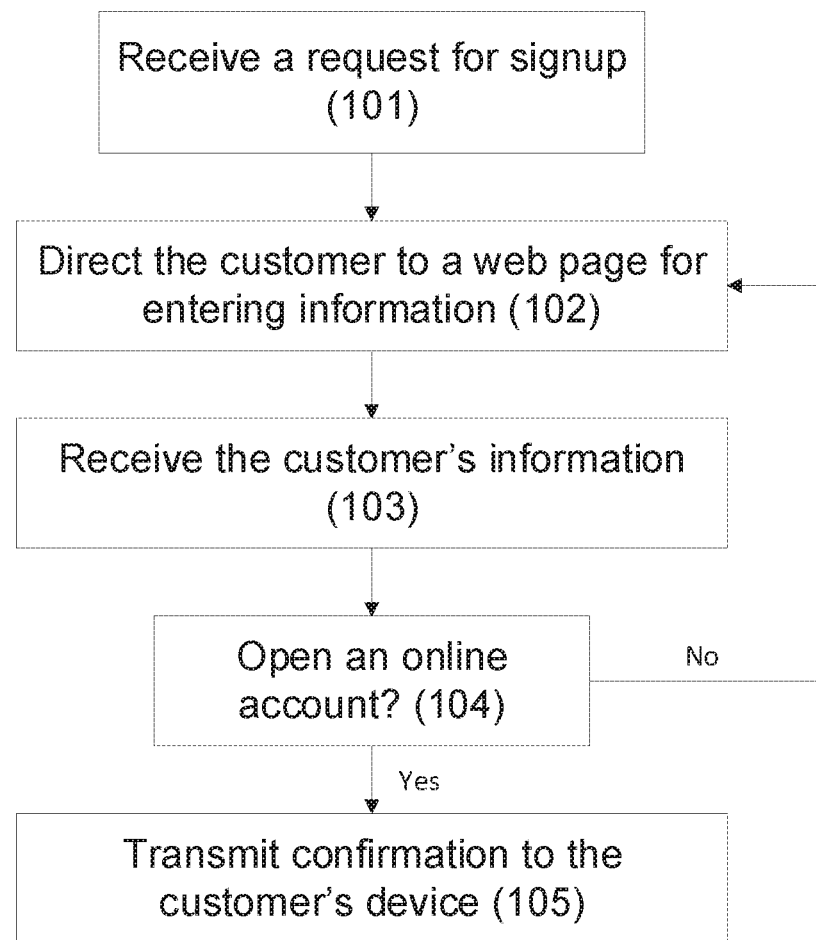
FIG. 1 shows an example flow process for signing up for an online account.

In an example embodiment of the present disclosure, a user can sign up for an online account with a service provider. A user can decide to open up an online account for a variety of reasons. For example, a user might decide to sign up for an online account because the user intends to review the user's information (e.g., purchase history) on the website of a service provider. As another example, the user might decide to sign up for an online account because the user desires to conduct online transactions on the service provider's website. In some embodiments, the user can sign up for an account that is not an online account. For example, the user can sign up for an account on the user's local desktop. Another example of an account can be a device that locks if it is provided with an incorrect password, e.g., an electronic watch, a cellphone, augmented reality glasses, etc.

In some embodiments, the service provider can require the user to visit the service provider's website to sign up for an online account. The website can have a link, a button, a web page or other surfing indicia which can direct the user to enter the user's information. This information, for example, can include the user's name, email address, username, password, reset phrase and a reset media. This list is illustrative and is not meant to be exhaustive. In some embodiments, the signing up process can take place using on an application (or app) of the service provider. The user can visit the service provider's website and download the service provider's application. The user can run the service provider's application on a device of the user. The device can be a smartphone, a cell phone, a laptop, a desktop, a notebook, a tablet, a wearable device, etc.

Once the user provides the information requested on the website (or app) of the service provider, the user can transmit the information to the service provider. For example, the user's device can have a user interface which displays the website of the service provider. This user interface can include a link, button or other indicia for the user to request transmission of the information to the service provider.

Upon receiving this information at a server of the service provider, the service provider can decide to open up the online account for the user. This decision can be based on, e.g., whether the user's information exists in the system. This decision can also be based on whether the user's username exists in the system or whether the password meets the minimum requirements indicated on the service provider's website.

Once the sign-up process is completed, e.g., the server of the service provider approves the username and password of the user, the user can be notified that an account has been created. This notification can happen on the user interface of the user's device, or it can happen via an email or other mode of communication. Subsequently, the user can log into the online account of the user and visit the user' information or request services.

FIG. 1 shows an example flow process for signing up for an online account. In the example embodiment of FIG. 1, the user can be an online customer for a retail store, and by opening an online account, the customer intends to review his purchase history. The online customer can visit the retailer's website and request opening of an online account by, for example, clicking on a button for new users. In step 101, a server of the service provider receives the customer's request for signing up for an online account. Subsequently, in step 102, the server transmits to the customer a communication including various questions or redirects the customer to another web page through which the customer can enter the customer's information to open an online account. Thus, a new web page can be displayed on the user interface of the customer's device. The web page can include a form which has several questions. The questions can ask the user to designate a username and password for the account. The questions can also ask for personal information from the user, e.g., email address, telephone number, checking account umber, etc.

The web page can also include a button or link, which the customer can press upon disclosing all the information requested on the web page. Upon pressing the button, the customer's device transmits the user's information to the bank's server, and in step 103, the server receives the customer's information. Subsequently, in step 104, the server determines whether to open an online account for the bank customer. For example, if the provided username does not exist in the system, the server can determine to open an account, and in step 105, the server transmits a confirmation message to the customer that an online account has been created for the user. On the other hand, if the username exists in the system, the server might prompt the customer to choose a different username, and the server returns to step 102. Similarly, if the selected password does not meet the minimum requirement for a password, the user might be prompted to select a different password, and the server would be returned to step 102.

In some example embodiments, the user is asked to identify on the same page a reset phrase, a username and password. In other embodiments, the user might be prompted after the username and password was selected by the user to identify a reset phrase. Other combinations are also possible. For example, in some embodiments, the user is not required to identify a reset phrase.

The reset phrase can be at least one character, symbol, word, or a term (or even a media file) which can be displayed to the user when the user requests a resetting of the user's password. The user can type this phrase in any language recognized by a computer. In some embodiments, the reset phrase is a photo, an image, or a short video clip. Some users can use the reset phrase to remind themselves of the reset media. For example, the online customer can use the following phrase as the reset phrase: "Your dog Charlie!" Similarly, the customer can select a photo of "Charlie" to be uploaded into the server of the retailer as the customer's uploaded media file. Once the customer requests the retailer to reset the password for the customer's online account, the retailer's server can transmit the phrase "Your dog Charlie!" and a few photos to the customer's device. This phrase can remind the customer that the customer uploaded a photo of "Charlie" in the system, and thus, the customer would select the photo of "Charlie" in the lineup of the photos.

In some embodiments, at the sign-up stage, the user can select several media files to be uploaded into the computer system of the retailer. The media files can be, for example, photos, video files, sound recordings, text files, etc. The media files can be of the same type or of different types. For example, the user can upload only photos (which are media files of the same type) or can upload a mix of photos and video clips (which are media files of different types). Although photos and media files were used as examples of files to be uploaded, the user is not limited to uploading only media files into the computer system. A user can upload other files as the reset file as well, e.g., an encrypted text, an executable file, etc.

In an example embodiment, a user can create a user profile. The user profile can be created when the user is signing up for the account or after the user signs up for the account. The user profile can include various information about the user. For example, a user profile can include a date of birth of a user, an address, a photo of the user, etc. The user profile can also include the user's username, password, reset phrase and reset media file. In an example embodiment, it is possible to include other information in a user profile as well. For example, the service provider can add information to the user profile of the user. This information can be an interaction history of a user with the service provider, an analysis of a user's behavioral characteristics, a regression analysis and other analysis pertaining to the user's traits and habits.

Although the example embodiments of this disclosure depict various embodiments pertaining to an online account, this disclosure is not limited to online accounts, and one of ordinary skill in the art recognizes other types of accounts or setups which can implement the teachings of this disclosure, e.g., voicemail account, desktop account, virtual reality account, etc.

Updating the Security Questions

In an example embodiment, a user can upload, modify, update or delete user information after signing up for an account. The user can also modify, update or delete the user's profile or the information provided in the user's profile. Accordingly, a user can provide information items such as a reset phrase or a reset media file after the user opens up the account. Additionally, the user can change these information items after the user opens up the account.

For example, once a user signs into the user's account, there can be a link to the user's profile. By clicking on the user's profile, the user interface of the user's computer displays some or all of the information stored in the user's profile. This information can be the user's username, reset phrase, reset media, user's address, etc. Other information can also be displayed to the user on the profile page. There can be a link next to each one of the information fields displayed on the user's profile. For example, there can be a link next to the user's reset phrase, and by clicking on the link, the user can modify or update the user's reset phrase on file with the service provider. In some embodiments, the user can click on an information field to update or modify the information displayed in the information field. For example, the user can click on the information field including the user's reset phrase to modify the user's reset phrase.

In some embodiments, the user can update, modify or delete the user's reset media file. For example, the website of the service provider can be configured to display the user's profile in response to a user's request for visiting the user's profile. Once on the profile page, the user can request changing the reset media file (or adding a media file to the profile). In response to this request, the user can be prompted to identify a new media file. The user can select the new media file and press a button to upload the media file into the system.

The Reset Process

In an example embodiment, a user with an online account decides to reset the user's password for the online account. This might happen when, for example, the user forgets the user's password. The user can submit a password reset request in various ways. For example, the user can visit the service provider's website and click on a link, button or other indicia to indicate that the user needs to reset the password (i.e., reset link). As another example, the user can call or email the service provider.

In some embodiments, the user has to provide certain information about the user when or after the user submits the password reset request. For example, a service provider can ask for the user's username when or after the user clicks on the reset link. In these embodiments, on the web page including the reset link, there can be a field for disclosing the user's username, and the link might not be activatable unless the user enters the user's username. In other embodiments, the user's username can be asked from the user after the user clicks on the reset link. Other means of obtaining the user's username are also possible.

In yet some other embodiments, the user's username is not provided to the service provider when the user requests a password reset. For example, instead of a username, the user can be asked to provide the user's email address or other personal information (e.g., date of birth, address, etc.) to the service provider. In some embodiments, a server of the service provider can recognize the user by analyzing the password reset request received at the server. For example, the request can include a piece of information about the user or the user's computer, e.g., IP address, network address, geolocation, cookies, device fingerprint, etc.

Figure 2:
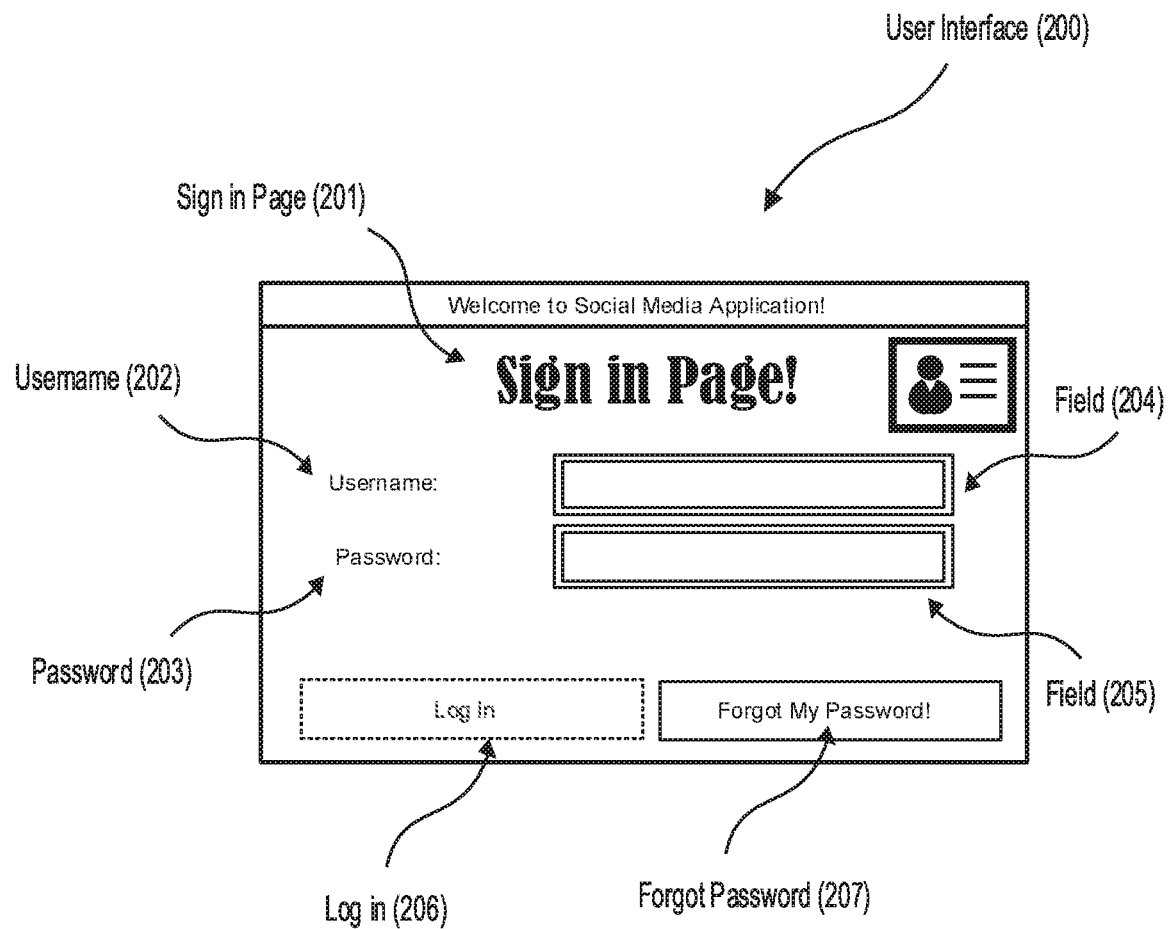
FIG. 2 shows a sign in page of a user interface of an application for a social media.
Figure 3:
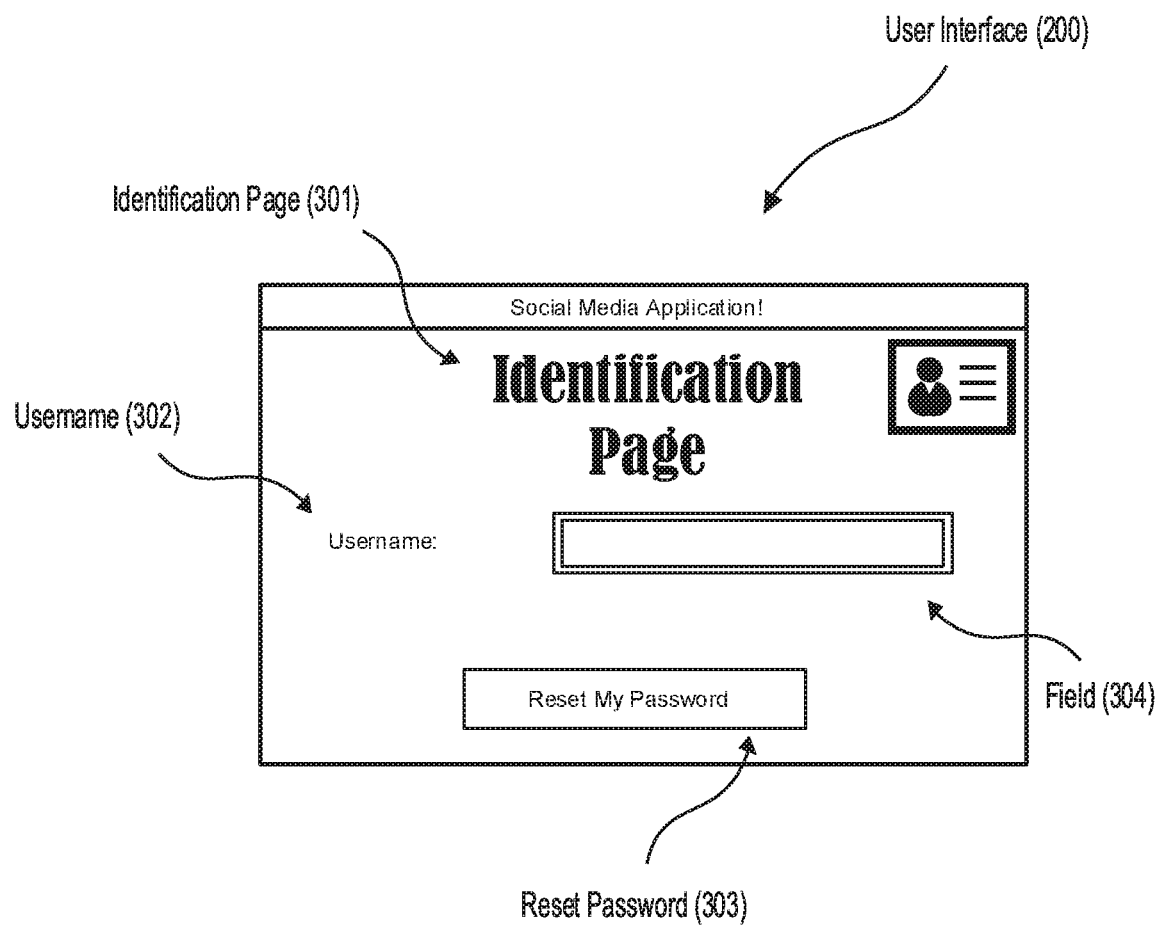
FIG. 3 shows an identification page in the user interface of the application for the social media.

FIG. 2 shows a sign in page 201 of a user interface 200 of an application for a social media. In this example embodiment, the sign in page 201 can ask for the user's username 202 and password 203. The user can enter the user's username and password in the fields 204 and 205. The sign in page 201 can also have a button 206 for signing in and a forgot password button 207 for resetting the user's password. The user can press the forgot password button 207 to initiate a reset of the user's password. Upon pressing this button, a request can be submitted to a server of the service provider. This request can be submitted by the user's computer or device which displays the user interface 200. In response, the server can direct the user to another page for identifying the user. However, in some embodiments, the user does not need to be directed to another page for identification and the reset can take place on the same page. FIG. 3 shows an identification page 301 in the user interface 200 of the application for the social media. In this example embodiment, the identification page 301 can ask the user for the user's username. The user can enter a username 302 in the field 304 of the identification page 301 and press the reset password button 303.

In some embodiments, a server of the service provider can receive the user's request for resetting the user's password, e.g., when the reset password button 303 is pressed. The request can include the user's username or other information which can facilitate the identification of the user, e.g., email address. Using this information, the server can identify the user and determine which user account or online account needs to be reset. This identification can be done, for example, by the server looking up a data structure in a database. In some embodiments, the server can look up the user's profile to determine which questions to ask the user to reset the password. The user's profile can include, for example, the user's personal information such as name and address, username, password (or encrypted password), reset phrase, any photos or media files that the user uploaded for resetting the user's password, etc. The user's profile can be stored in a database of the server which received the reset request.

Once the server looks up the user's profile (or other data structure in the database), the server can determine which information to present to the user and which information to request from the user to reset the password. For example, the server can display a reset phrase and several media files to the user and the user can select the media file that the user uploaded into the server when the user created the user's profile (or account). This media file can be called the uploaded media file.

Subsequently, the server can transmit certain information to the user. For example, the server can direct the user to a password reset page which can include the reset phrase and several media files. Also, the password reset page can include various questions. In some embodiments, the user is automatically directed to the password reset page once the user clicks on the link or button on the identification page. In some embodiments, in order for the user to be directed to the password reset page, the user can receive an email. For example, upon clicking on the link or button on the identification page, the user can receive an email including a link or button for directing the user to the password reset page. In some embodiments, an Internet address can be mailed in a letter to the user (instead of an email).

Once the user is directed to the password reset page, the user can be prompted with one or more media files. The user can also be prompted with the reset phrase. The user can also be prompted with one or more questions. The password reset page can also include any combination of these items or any other items.

Figure 4:
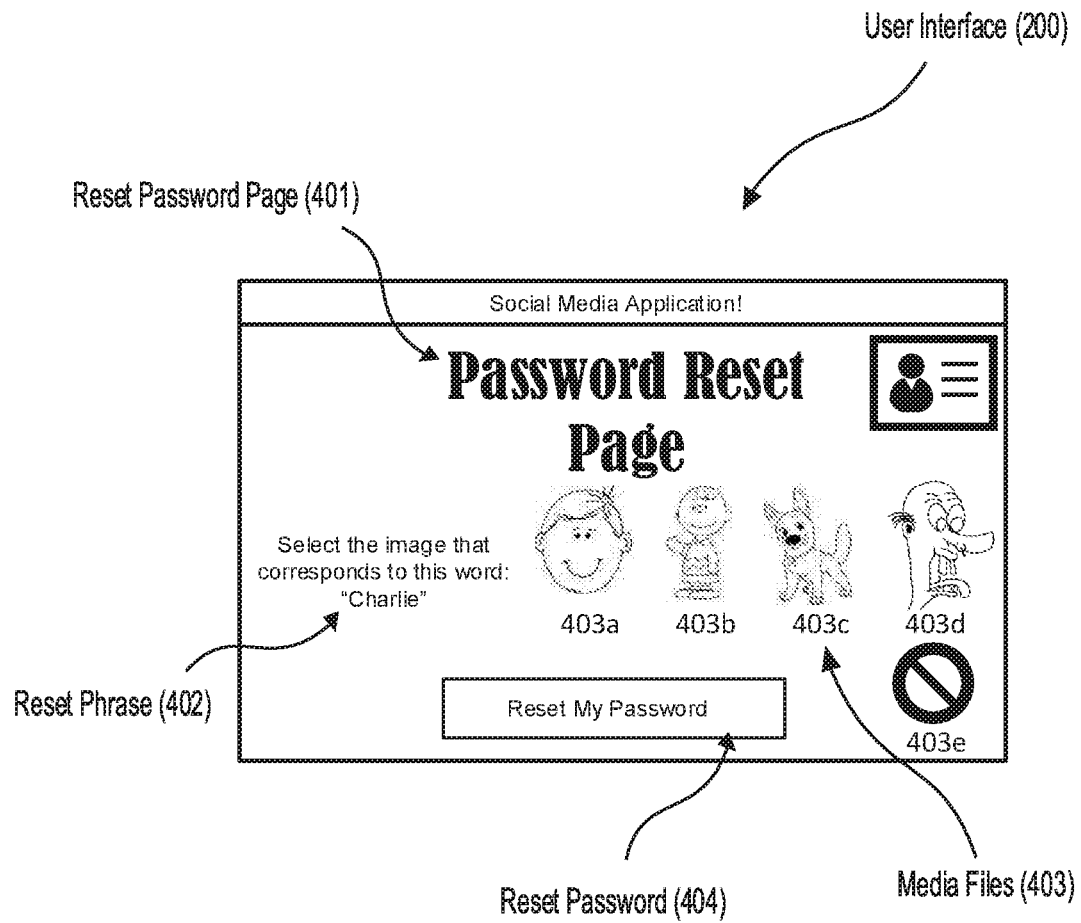
FIG. 4 shows an example password reset page of the user interface of a social media application.

FIG. 4 shows an example password reset page 401 of the user interface 200 of a social media application. In this example embodiment, the user uploaded the photo 403*b* as the user's media file and chose "Charlie" as the user's reset phrase. The service provider's server can transmit media files 403 to the user's device. The user's device can display the password reset page 401 on the user's device. The password reset page 401 can display the user's reset phrase 402 and several media files 403. Displaying the user's reset phrase is optional. The media files 403 can be chosen by the artificial intelligence of the server. The artificial intelligence can choose the media files 403 every time the user requests to reset the password. Alternatively, the artificial intelligence of the server can choose the media files for a predetermined period of time, i.e., it transmits the same files to the user during this period of time no matter how many times asked by the user to reset the password. The user interface 200 is configured to receive a user selection of one or more of the media files displayed on the password reset page.

In this example embodiment, media files 403 include the user's uploaded media file (at the time the online account was setup), i.e., 403*b*. However, there is no requirement to display the user's uploaded media file every time. As such, in some embodiments, the server can transmit several media files to be displayed on the password reset page, and occasionally none of these media files is the media file that the user uploaded into the server of the service provider when the user opened up the account. In these embodiments, on the password reset page, the user can be prompted to select the uploaded media file. However, when the media file is not displayed on the user interface, the user cannot select any of the displayed media files. In some embodiments, there is a process for the user to express that the media file is not displayed on the user interface. For example, the server is configured to transmit to the user's device a media file indicating that the user's media file is not displayed, e.g., media file 403e in FIG. 4. Selection of this media file by the user can indicate that the user does not see the user's uploaded media file. As another example, the user can simply press a button, e.g., reset password button 404, without selection of any media files to indicate that the uploaded media file is not displayed. In the embodiments which do not display the uploaded media file, the safety of the system can be enhanced because the server does not have to display the user's chosen media file all the time. Therefore, a potential hacker would not be able to discover a range of media files for the user's uploaded media file.

In some other embodiments, the user can upload multiple media files when the user sets up the account (or profile), or when the user modifies or updates the user's reset media file(s). In these embodiments, the sever can be configured to transmit some, all or none of these uploaded media files to the user's device to display them on the password reset page. The password reset page can require the user to select all or some of the displayed media files which were uploaded by the user, and thus, the user can select multiple media files. In these embodiments, the uploaded media file which is displayed can change or rotate, and thus, the security of the system can be enhanced.

Regardless of how many media files the user uploads when the user sets up the account (or modifies the account), the user interface can allow the user to select multiple media files. Allowing users to select multiple media files on the password reset page can enhance the security of the system because a potential hacker would not be able to guess how many media files the user has uploaded into the system.

Once the media files are displayed to the user on the password reset page, the user can select, choose or identify one or more of the media files and the user's device can transmit the user's selection (or an identification of the user's selection, e.g., file name, size, extension, etc.) to the server. In some embodiments, the device can automatically transmit the selection to the server once the user, for example, clicks or taps on a media file. In some other embodiments, the device can transmit the selection after the user initiates the transmission by, e.g., pressing a button. In FIG. 4, the user can select any one or ones of the media files 403 by tapping on the media file. For example, the user can tap on media file 403b. The user can also select multiple media files by, for example, tapping on media files 403b and 403c. The transmission of the selection by the user to the server can occur after the user presses the reset password button 404. These methods for selecting media files are not exhaustive and one of ordinary skill in the art recognizes that several other techniques are known for choosing, selecting or identifying the uploaded media file on the password reset page (or elsewhere).

Once the user's selection is transmitted to the server, the server can determine whether the user selected the correct media files, i.e., uploaded media files, and decide whether to reset the password. Specifically, if the user identifies the correct media file (or files), the user's password can be reset. Otherwise, the user's account can be locked if the user has exceeded a threshold number of attempts in resetting the password. In some embodiments, the user's account cannot be locked even if the user has had many failed attempts to reset the password.

There are several techniques for resetting the user's password. For example, the server can issue a temporary password for the user, transmit it to the user's device, and the user's device can display the temporary password to the user on the device's user interface. As another example, a temporary password can be emailed or mailed to the user. Once in possession of the temporary password, the user can visit the website of the service provider to access the user's account. In some embodiments, upon entering the temporary password on the website, the user will be prompted to choose a new password.

In some embodiments, upon selecting the correct media file, the server can reset the password by asking the user to select a new password. For example, the server can direct the user to a web page which includes a field for typing the user's new password. In some other embodiments, instead of a temporary password, the server can simply disclose the user's password to the user, e.g., on the user's device, via email or by mail.

Figure 5:
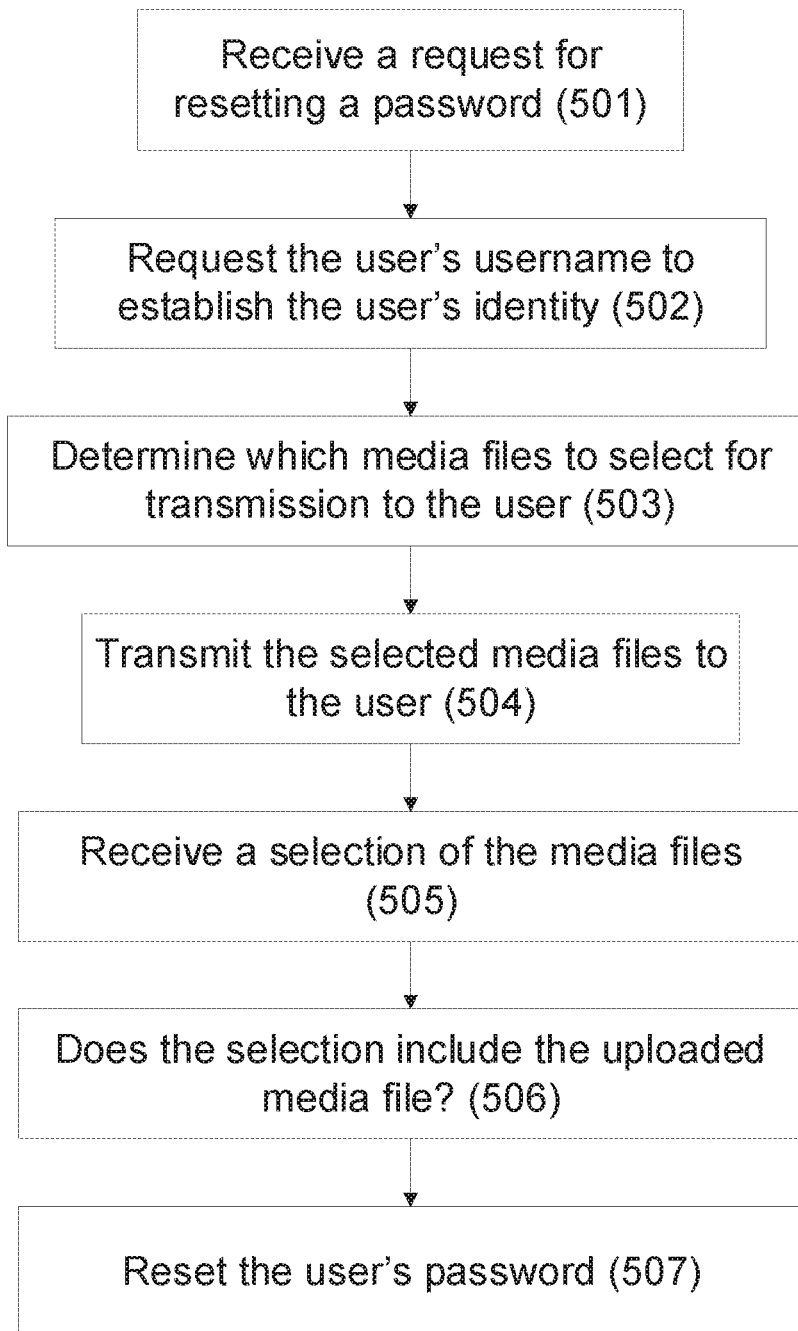
FIG. 5 shows an example flow process for resetting a user's password.

FIG. 5 shows an example flow process for resetting a user's password. In this example embodiment, when opening the account, the user uploaded a video clip as the user's reset media file. In step 501, the user selects a link on the service provider's website to request a reset of the user's password. In step 502, the service provider requests the user to identify herself by providing the user's username. Once the server receives the user's username, the server looks up the user in a database to identify the user's uploaded media file, e.g., video clip. Then, in step 503, the server can decide which media files to select for transmission to the user. For example, the server can select related media files and the user's uploaded media file. The related media files and the uploaded media file can include the same type of media files, e.g., all can be video clips, or they can be of different types, e.g., a mix of voice recordings and video clips. The selected media files can include the video clip which the user uploaded as the reset media file, or the transmitted media files can exclude this video clip. The server can decide which media files to transfer to the user. Upon determining which media files to transmit to the user, in step 504, the server can transmit the selected media files, e.g., video clips, to the device of the user. Once the media files are displayed on the user interface of the device of the user, the user can be prompted to identify the uploaded media file. Then, in step 505, the user can select one of the transmitted media files, and the user's device transmits this selection (e.g., an identifier of the selected media file) to the server.

In step 506, the server determines whether the user has correctly identified the uploaded media file or files, and thus, the server determines whether to reset the user's password. If the user has identified the correct media file, e.g., video clip, in step 507, the server resets the user's password. In some embodiments, if the user has made an incorrect selection more than a threshold number of times, i.e., the user has had a few failed attempts to reset the password, the server can lock the user's account to prevent any resetting of the user's password. Thus, in step 508, the sever can determine whether the user has exceeded the allowed number of attempts for resetting the password. If the user has not exceeded the allowed number of attempts, the server returns the user to step 505 to select a media file again. If the user has exceeded the allowed number of attempts, in step 509, the server locks the user's account. The user might have to contact or visit the service provider to unlock the account. The Artificial Intelligence When a user requests a password reset, the server can transmit to the user several media files. The media files can include an uploaded media file (which was designated as the reset media file) and several related media files. The server can select the related media files. In some embodiments, the selection can be based on a media file search algorithm. For example, there can be a database on the sever which stores various media files. The search algorithm can search the media files, e.g., photos, videos, and sound recordings, stored on this database. The search algorithm can include a criteria for performing the search. The search criteria can be similarity (within a tolerance range) between a media file and the uploaded media file. For example, a photo can be selected if the photo is similar to a reset photo uploaded by the user. Also, a sound recording can be selected if it is similar to an uploaded sound recording. The search algorithms are not limited to items stored on a database, and a server can search for related media files on networks such as the Internet. In an example embodiment, the database can include the uploaded media files of all the users, and at least some of the related media files are other user's uploaded media files. In another example embedment, there can be an overlap between the related media files of various users. For example, the server can select at least one of the related media files of one user for another user.

In an example, the uploaded media file can be a photograph of a human face and the related media files can be several photographs of human faces because the search algorithm determines that these photographs are similar within a tolerance range to the uploaded photo. In another example embodiment, the user can upload a photograph of a dog and the related media files can be several photographs of dogs. Again, the search algorithm can determine that these photographs are similar. In yet another example embodiment, the uploaded media file can be a country music track and the search algorithm can be configured to select several country music tracks as the related media files. In yet another example embodiment, the uploaded media file be a video clip of a dog playing in a field. The search algorithm is configured to select several video clips including dogs playing in fields. In one embodiment, the uploaded media file can be a video of waves, and the search algorithm is configured to select several video of waves.

In an example embodiment, there can be several uploaded media files and the server can select the related media files based on the similarity of the media files to any of the uploaded media files. For example, if the user uploads two photographs into the server, the server can search for photographs which are similar to either one or both of the uploaded photographs. In an example embodiment, the user can upload different types of media files into the server. For example, the user can upload a photo and a video file into the server. In this case, the related media files can be similar to either the photo or the video file. In other words, the related media file can be similar to either one of the media files.

There can be several algorithms for selecting a related media file. In an example embodiment, there can be several predetermined categories of media files. The server can disclose these categories of media files to the user and the user can be asked (or the user can choose) to upload a media file which would belong to one of these categories. For example, the sever can include a category for cats, and the server can ask the user (or the user can choose) to upload a photo of a cat. In these embodiments, the related media files can be selected based on the category of an uploaded media file. For example, all the related media files can be selected from the same category as the uploaded media file.

In an example embodiment, some of the media files stored on the server's database can be tagged with words. Also, the server can be configured to tag the uploaded media file with at least one word. The tagging can be done manually or the sever can automatically tag the media files. For example, the server can include a face recognition module or an object recognition module for tagging the uploaded media file and/or the media files stored in the database. The object recognition module can be configured to ascertain various objects included in a media file and associate words with them. As another example, the object recognition module can be configured to perform an image-to-image matching, e.g., an object in the image can be matched with a known image of a known object. Once the uploaded media file is tagged, the server can search for related media files based on the tag of the uploaded media file. For example, if the uploaded media file is tagged with the word "table" (i.e., the object recognition algorithm discovered a table in the photo), the server can look for media files which were also tagged with the word "table." This search can produce media files of the same type, e.g., all photos that include tables, or media files of different types, e.g., videos and photos that include tables. Ultimately, the server can transmit the related media files and the uploaded media file to the user's device, which can display them on a password reset page. Because the media files are all similar, a hacker is less likely to guess the uploaded media file base on the information available on the Internet.

There are several techniques for implementing the object recognition module. In an example embodiment, a model can be trained from scratch, i.e., a very large labeled dataset can be gathered, and a network architecture learns the features of the objects included in the dataset. In another example embodiment, a pre-trained deep learning model can be used. In this technique, one starts with a pre-trained model and feeds in new data containing previously unknown classes of objects. The process involves fine-tuning the pre-trained model. In yet another example embodiment, template matching can be used. This technique uses a small image, or template, to find matching regions in a larger image. In yet another example embodiment, image segmentation and blob analysis can be used. This technique uses simple object properties, such as size, color, or shape to recognize objects.

Some embodiments of object recognition module can use machine learning. For example, a collection of images (or video files) can be gathered, and one can select the relevant features in each image. A feature extraction algorithm might extract edge or corner features that can be used to differentiate between classes in the data. These features are added to a machine learning model, which will separate these features into their distinct categories, and then use this information when analyzing and classifying new objects.

In an example embodiment, a photo search algorithm can be used for selecting a related media. For example, the server can include a database storing many photos. The server can use a photo search algorithm to find photos that are similar to the uploaded photo. For example, the photo search algorithm can use scale-invariant feature transform ("SIFT"), which is a technique for detecting feature points in an image. SIFT can find distinctive keypoints that are invariant to location, scale and rotation, and robust to affine transformations (changes in scale, rotation, shear, and position) and changes in illumination. Using SIFT, the server can find photos that include features points that are similar to the uploaded photo. In another example, the photo search algorithm can use the maximally stable extremal regions (MSER) algorithm. The MSER algorithm can be used in image registration and region matching. Using the MSER algorithm, the server can find photos that include features points that are similar to the uploaded photo.

In an example embodiment, a sound recording search algorithm can be used for selecting a related media. The sound recording search algorithm can use an acoustic fingerprint, which is a condensed digital summary, or a fingerprint, deterministically generated from an audio signal. An acoustic fingerprint can be used to identify an audio sample or quickly locate similar items in an audio database. A Fast Fourier Transform can be used to implement acoustic fingerprinting.

These algorithms, e.g., MSER and acoustic fingerprint, can also be used for video files. In the case of a video file, the video file can be broken into several frames, each frame including an image. The sever can perform an analysis between the frames of the video file and an uploaded image or uploaded video. Using this analysis, if the sever determines that the video file is similar to the uploaded file, the sever can decide that the video file is a related video file. The sever can also perform an analysis of the sound recording of a video file to determine whether it is similar to an uploaded media file which includes a sound recording.

The search algorithm can include a criteria for performing the search. The search criteria can be similarity (within a tolerance range) of a media file to the uploaded media file. The tolerance range can determine how similar the related media files are to the uploaded media file. In other words, a low tolerance range can indicate that the related media files are very similar to the uploaded media file and a high tolerance range can indicate that the related media files are not very similar to the uploaded media file.

The tolerance range can vary based on various factors, e.g., how frequently the user logs into the system. For example, for a user who infrequently logs in, the server can allow a higher threshold of tolerance because similar images can confuse the user. On the other hand, for a user who frequently logs into the system, the server can allow a lower threshold of tolerance because the user probably has a fresh memory of his uploaded media file.

Technical Implementation of the Sever

Figure 6:
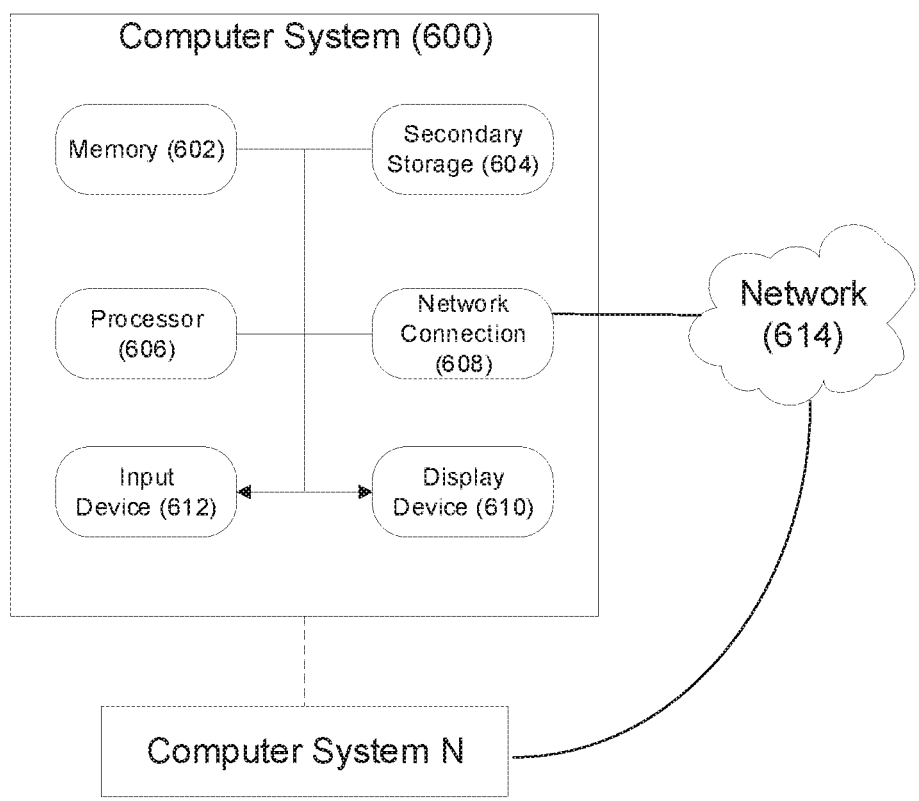
FIG. 6 illustrates exemplary hardware components for a server.

FIG. 6 illustrates exemplary hardware components for a system and apparatus for a computer or a server to reset a user's password. A computer system 600, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 600, may run an application (or software) and perform the steps and functionalities described above. Computer system 600 may connect to a network 614, e.g., Internet, or other network, to receive inquires, obtain data, and transmit information and incentives as described above.

The computer system 600 typically includes a memory 602, a secondary storage device 604, and a processor 606. The computer system 600 may also include a plurality of processors 606 and be configured as a plurality of, e.g., bladed servers, or other known server configurations. The computer system 600 may also include a network connection device 608, a display device 610, and an input device 612.

The memory 602 may include RAM or similar types of memory, and it may store one or more applications for execution by processor 606. Secondary storage device 604 may include a hard disk drive, floppy disk drive, CD-ROM drive, or other types of non-volatile data storage. Processor 606 executes the application(s), such as those described herein, which are stored in memory 602 or secondary storage 604, or received from the Internet or other network 614. The processing by processor 606 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 600 may store one or more database structures in the secondary storage 604, for example, for storing and maintaining the information necessary to perform the above-described functions. Alternatively, such information may be in storage devices separate from these components.

Also, as noted, processor 606 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 600.

The input device 612 may include any device for entering information into the computer system 600, such as a touch-screen, keyboard, mouse, cursor-control device, microphone, digital camera, video recorder or camcorder. The input and output device 612 may be used to enter information into GUIs during performance of the methods described above. The display device 610 may include any type of device for presenting visual information such as, for example, a computer monitor or flat-screen display (or mobile device screen). The display device 610 may display the GUIs and/or output from sub-system components (or software).

Examples of the computer system 600 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 600 is shown in detail, system 600 may use multiple computer systems or servers as necessary or desired to support the users and may also use back-up or redundant servers to prevent network downtime in the event of a failure of a particular server. In addition, although computer system 600 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 600, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A method comprising:
receiving a first request for opening an account at a server, wherein the first request was obtained from a device;
responsive to receiving the first request, transmitting, from the server to the device, a set of questions;
receiving, at the server, a response to the set of questions, the response including a username, a password, a reset phrase, and a reset media file, wherein the server is configured to grant access to an account associated with the username when the server receives the username and password
receiving, at the server, a second request for resetting the password from a second device;
responsive to receiving the second request, transmitting, from the server to the second device, a communication including the reset phrase and a plurality of media files, wherein:
the plurality of media files include a plurality of related media files and the reset media file;
the server is configured to associate each of the media files with at least one first word:
the server is configured to associate the reset media file with at least one second word; and
the server chooses each of the plurality of related media files based on a determination that the at least one first word matches the at least one second word;
receiving, at the server from the second device, a selection of at least one of the plurality of media files; and
responsive to receiving the selection, determining whether the selection matches the reset media file, and if the selection matches the reset media file, transmitting a temporary password to a user such that the server can grant access to the account when it receives the username and the temporary password.

2. The method of claim 1, wherein the server uses an object recognition module for associating each of the media files with the at least one first word.

3. The method of claim 1, wherein the server uses an image-to-image matching technique for associating each of the media files with the at least one first word.

4. The method of claim 1, wherein the plurality of media files are photos and the server uses a photo search algorithm to choose each of the plurality of related media files.

5. The method of claim 4, wherein the photo search algorithm uses scale-invariant feature transform.

6. The method of claim 1, wherein the plurality of media files are video recordings and the server uses a video recording search algorithm to choose each of the plurality of related media files.

7. The method of claim 6, wherein the video recording search algorithm includes at least one of a maximally stable extremal regions algorithm and an acoustic fingerprint.

8. The method of claim 1, wherein the reset media file is associated with a category of objects and each of the plurality of related media files relates to an object in the category of objects.

9. The method of claim 8, wherein the set of questions includes the category of objects.

10. The method of claim 1, wherein the response to the set of questions includes a plurality of reset media files.

11. The method of claim 10, wherein the plurality of media files in the communication include at least one of the plurality of reset media files.

12. The method of claim 11, wherein the selection matches if the at least one of the plurality of reset media files is identified in the selection.

13. The method of claim 10, wherein one of the reset media files is a photo and another one of the reset media files is a video recording.

14. The method of claim 13, wherein the plurality of media files in the communication include at least one photo and at least one video recording.

15. A method comprising:
transmitting, from a device, a first request for opening an account to a server, wherein the first request is entered into a user interface of the device;
displaying a set of questions received from the server in the user interface of the device;
transmitting, from the device to the server, a response to the set of questions, the response including a username, a password, a reset phrase, and a reset video file, wherein the response is entered using the user interface of the device;
transmitting, from the device to the server, a second request for resetting the password, wherein the second request is entered from the user interface of the device;
receiving, at the device from the server, a communication including the reset phrase and a plurality of video files, wherein:
the communication is displayed on the user interface of the device;
the video files include a plurality of related video files and the reset video file; and
the plurality of video files are associable with at least one word, the at least one word being the same for all the plurality of videos;
transmitting, from the second device to the server, a selection of at least one of the plurality of video files, wherein the selection is entered using the user interface of the device; and
receiving a temporary password at the device if the selection matches the reset video file, wherein in response to transmitting the username and the temporary password to the server, the device is configured to access the account.

16. The method of claim 15, wherein the response to the set of questions includes a plurality of reset video files.

17. The method of claim 16, wherein the plurality of video files in the communication include at least one of the plurality of reset video files.

18. The method of claim 17, wherein the selection matches if the at least one of the plurality of reset video files is identified in the selection.

19. A method comprising:
- receiving, at a server from a device, a request for resetting a password for an account;
- responsive to receiving the request, transmitting, from the server to the device, a communication including a reset phrase and a plurality of media files, wherein:
  - the media files include a plurality of related media files, and at least one of the reset media file and a media file indicating that the reset media file is not displayed;
  - the server is configured to associate each of the media files with at least one first word;
  - the server is configured to associate the reset media file with at least one second word; and
  - the server chooses each of the plurality of related media files based on a determination that the at least one first word matches the at least one second word;
- receiving, at the server from the device, a selection of at least one of the plurality of media files; and
- responsive to receiving the selection, determining whether the selection matches the reset media file, and if the selection matches the reset media file, transmitting a temporary password to a user such that the server can grant access to the account when it receives the username and the temporary password.

\* \* \* \* \*